(12) United States Patent
Price et al.

(10) Patent No.: US 7,532,571 B1
(45) Date of Patent: May 12, 2009

(54) PROVIDING ONLINE CONNECTIVITY ACROSS A RANGE OF ELECTRONIC COMMUNICATIONS SYSTEMS

(75) Inventors: Michael Price, San Diego, CA (US); Alec Dun, Redmond, WA (US); Gulsen Demiroz, Redmond, WA (US); Ronald Eric Gray, Redmond, WA (US); David Raissipour, Issaquah, WA (US); Aaron Hartwell, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/608,944

(22) Filed: Jun. 27, 2003

(51) Int. Cl.
    *H04L 12/26* (2006.01)
(52) U.S. Cl. .............. 370/225; 370/392; 379/93.35; 709/239
(58) Field of Classification Search ............ 370/225, 370/392; 379/93.35; 709/239
    See application file for complete search history.

(56) References Cited

U.S. PATENT DOCUMENTS

| | | | |
|---|---|---|---|
| 5,819,019 A | 10/1998 | Nelson | 395/182.02 |
| 6,041,356 A | 3/2000 | Mohammed | 709/227 |
| 6,070,184 A * | 5/2000 | Blount et al. | 709/200 |
| 6,073,179 A | 6/2000 | Liu et al. | 709/229 |
| 6,199,172 B1 | 3/2001 | Dube et al. | 714/4 |
| 6,330,597 B2 | 12/2001 | Collin et al. | 709/220 |
| 6,725,290 B1 * | 4/2004 | Glover et al. | 710/15 |
| 6,785,371 B1 * | 8/2004 | Olafsson | 379/93.35 |
| 6,873,619 B1 * | 3/2005 | Edwards | 370/392 |
| 6,920,502 B2 * | 7/2005 | Araujo et al. | 709/229 |
| 7,136,645 B2 * | 11/2006 | Hanson et al. | 455/435.1 |
| 2004/0054804 A1 * | 3/2004 | Li | 709/239 |

* cited by examiner

*Primary Examiner*—William Trost, IV
*Assistant Examiner*—Toan D Nguyen
(74) *Attorney, Agent, or Firm*—Merchant & Gould P.C.; Alton Hornsby, III

(57) ABSTRACT

Methods and systems allow an application capable of online communication to monitor the availability of different electronic communications sources and provide transition between online and offline operation and between different electronic communications sources. When a change occurs in connectivity source status, such as when the user disconnects from a wireline connection or goes offline or when a connection is otherwise lost due to mechanical failure or loss of wireline or wireless signal or when a reduction in bandwidth or connection speed is detected, the application is automatically transitioned between online and offline status and between different types of connectivity source without user action and without interruption of use of the application. If an online connection may not be obtained via TCP/IP connection, a determination is made as to whether the application and computer operating system are configured for RPC/HTTP connectivity. If the application and computer operating system are configured for RPC/HTTP connectivity, RPC/HTTP connection is attempted.

47 Claims, 6 Drawing Sheets

PROVIDING ONLINE CONNECTIVITY ACROSS A RANGE OF ELECTRONIC COMMUNICATIONS SYSTEMS

FIELD OF THE INVENTION

The present invention relates to methods and systems for monitoring the availability of online connectivity and providing online connectivity across a range of electronic communications systems.

BACKGROUND OF THE INVENTION

With the advent of distributed computing environments, users have become accustomed to being connected to friends, business associates, and a variety of information sources. With modern computing systems, users may connect to remote electronic mail servers, web servers, databases, and the like using a number of different connectivity means. In a home or office, a user may connect her computer to a distributed computing environment via a high bandwidth wire line connection through which the user may send and receive large amounts of data very quickly. Alternatively, the user may connect to a distributed computing environment via a low bandwidth dialup connection through which the user may send limited amounts of data at a much slower pace. If the user cannot connect via a wire line connection, the user may utilize a local wireless network in her office, school, or home. If the user leaves the wire line or local wireless network connection systems of her home, office, school, and the like, the user may nonetheless connect to the desired computing environment via a wide area network wireless system. Between the various connection sources, the user may temporarily be offline altogether.

Unfortunately, such movement between communications connectivity sources makes for a less than enjoyable user experience. Often electronic mail client applications are highly sensitive to such network changes, especially where speed and connection reliability varies greatly between different connectivity sources and methods.

Accordingly, there is a need for a method and system for allowing an electronic mail or other client application capable of online communication to sense changes in network speed and connectivity availability to allow the application to perform in a predictable manner across online and offline sessions and across varying connectivity speeds and reliability.

SUMMARY OF THE INVENTION

Embodiments of the present invention provide methods and systems for allowing an application capable of online communication, such as an electronic mail application, to monitor the availability of different electronic communications sources (providers) and for providing a smooth and user-friendly transition between online and offline operation and between different electronic communications sources.

When a user launches an online session using an application capable of online communication, such as an electronic mail application, a connection manager object integrated with the application or called by the application monitors connectivity status for the session including connection type (wired, wireless), connection speed and connection bandwidth. Additionally, the connection manager uses network location awareness application programming interfaces ("API") for enumerating available connectivity sources such as wired networks, local wireless access points, wide area wireless access systems and dialup access. The connection manager receives notifications from the network location awareness APIs on network status, including whether a given network is operable or out of range in the case of a wireless network.

The connection manager communicates with the operating system of the user's computer to determine preferred connectivity. The connection manager automatically chooses the preferred connectivity source for use by the application where a preferred connectivity source is available among more than one available source.

When a change occurs in connectivity source (provider) status, such as when the user goes offline or when a connection is otherwise lost due to mechanical failure or loss of wireless signal, for example, or when a reduction in bandwidth or connection speed is detected by the network location awareness APIs, the connection manager object notifies the application of the connectivity status changes. The connection manager reports the connectivity changes to a set of connectivity objects, including an exchange provider object, a connection object, and a provider connection object.

The connection object is notified by the connection manager of connectivity source changes. The connection object understands connectivity source state and controls whether data calls from the exchange provider object out to a remote data server such as an electronic mail server, are passed through or are failed, such as is the case when the connectivity source is lost or the user has otherwise gone offline. When the connection manager is notified via the network location awareness APIs that a given connectivity source is no longer available, the connection manager notifies the connection object to cancel all data requests through the exchange provider object and instructs the connection object to resend the previously selected and utilized connectivity source. Any requests to the exchange provider object from this point will immediately fail until a subsequent connectivity status change is affected to allow data requests through the exchange provider object. Upon notification of the need to disconnect the application from a connectivity source, such as when the user goes offline, or upon the need to connect to a given source where a preferred source is now available, or where the user has selected a given source, the connection objects instructs the provider connection object to connect or disconnect at the appropriate time to or from the given connectivity source (provider).

If a preferred connectivity source (provider or network) becomes available as notified to the connection manager via the network location awareness APIs, the connection manager first attempts utilization of the available connectivity source by attempting contact with a remote server such as an electronic mail server through which the application is operating. If the connection manager successfully utilizes the available connectivity source, the connection manager notifies the connection object of the new connectivity source, and the connection object in turn instructs the provider connection object to connect the application to the available connectivity source, and the connection object allows data calls to pass through the exchange provider object to the remote server. If the connection manager is not able to contact the remote server via the available connectivity source, a determination is made as to whether the application and computer operating system are configured for RPC/HTTP connectivity. If the application and computer operating system are configured for RPC/HTTP connectivity, RPC/HTTP connection is attempted.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As described briefly above, embodiments of the present invention are directed to methods and systems for allowing an application capable of online communication, such as an electronic mail application, to monitor the availability of different electronic communications sources and for providing a smooth and user-friendly transition between online and offline operation and between different electronic communications sources (connectivity providers). In the following detailed description, references are made to the accompanying drawings that form a part hereof, and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
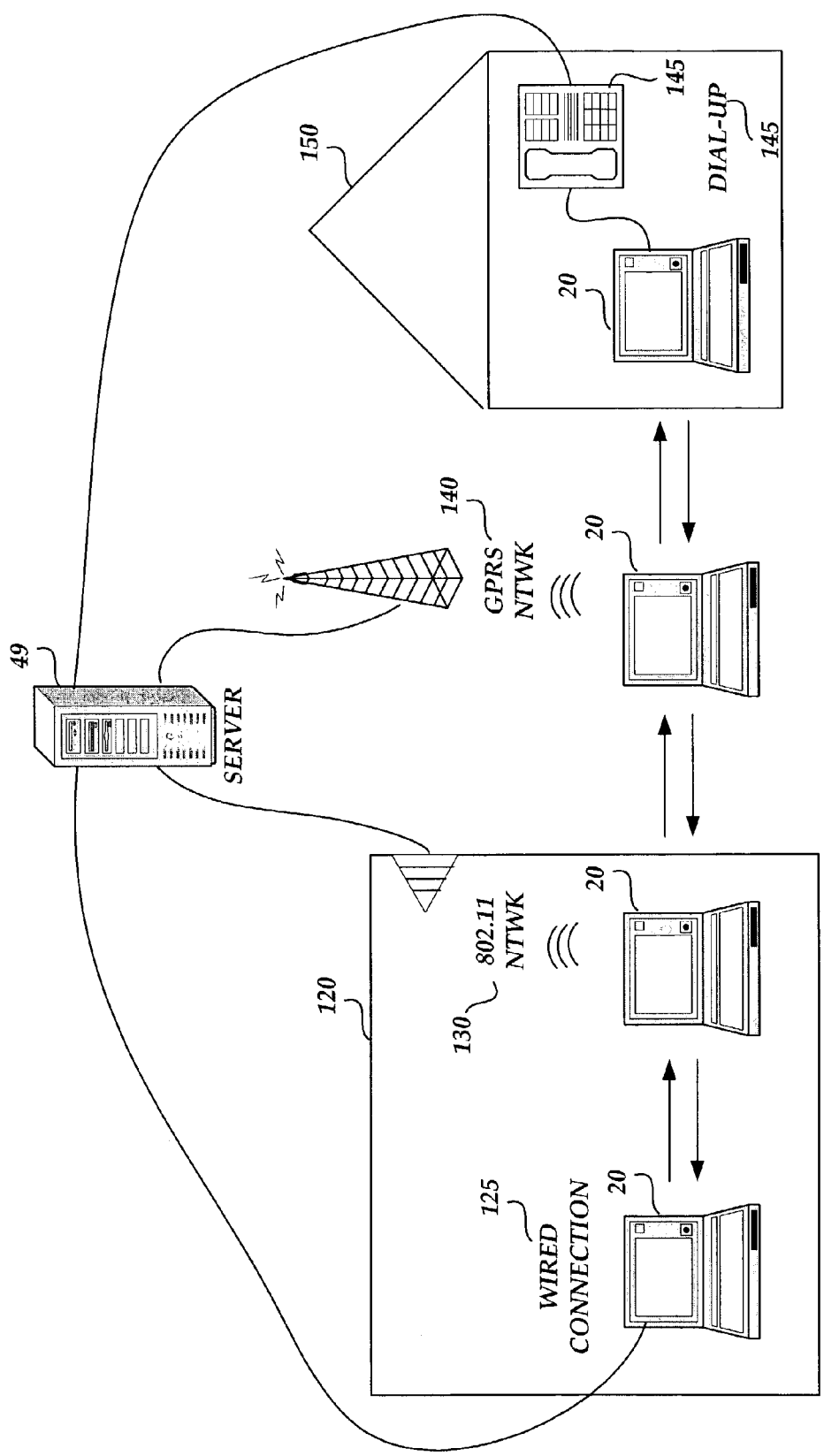
FIG. 1 is a simplified block diagram illustrating connectivity source transition from one source to another according to embodiments of the present invention.

Referring now to the drawings in which like numerals represent like elements through the several figures, aspects of the present invention and the exemplary operating environment will be described. FIG. 1 is a simplified block diagram illustrating connectivity source transition from one source to another according to embodiments of the present invention. According to embodiments of the present invention, the methods and systems are provided for allowing an application capable of online communication, such as an electronic mail application, to monitor the availability of different electronic communications sources (providers) and for providing a smooth and user-friendly transition between online and offline operations and between different electronic communications sources. A suitable electronic mail application is Outlook® manufactured by Microsoft Corporation of Redmond, Wash. Embodiments of the present invention allow the application capable of online communication to be aware of and sense changes in network connectivity including the speed and the reliability of data received via a given network connection so that the user experience in transitioning between connectivity sources and between online and offline operation successions is made more efficient and user-friendly.

Referring to FIG. 1, a computer 20 is illustrated in transition between online and offline sessions and in transition between a plurality of different online connectivity sources. Computer 20 is illustrated connected to a remote server 49 via a wired connection 125 in a corporate structure 120. The structure 120 is illustrative of an office building, school building, home, or other facility in which the user may connect her computer 20 through a wired connection. The wired connection may be any of a number of high speed connections such as a DSL line, cable modem connection line, T1, and the like.

If desired, the user may disconnect the computer 20 from the wired connection 125 and utilize a local area wireless connection through an 802.11 network 130. For example, the user may attach a wireless communications card, such as a personal computer memory card international association (PCMCIA) card for communicating with a wireless communication network located in the user's home office, school, and the like. The user may also communicate via a short-range wireless communications network such as a blue tooth network.

The computer 20 is also illustrated transitioning from the local wireless network 130 to a wide area wireless network such as a general packet radio service (GPRS) mobile network 140. The computer 20 is also shown transitioned to a low bandwidth and low speed dial-up connection 145 via a telephone 147 at a facility 150 that does not have a high bandwidth and high speed wired connection or access to a higher speed wireless connection.

By way of example, consider that a user is working on her laptop computer 20 which is docked and connected to a corporate wired connection 125 in her office building 120. The user undocks her computer 20 to go to a meeting in a separate conference room. According to embodiments of the present invention, the user's electronic mail software application detects the loss of the wired connection network and automatically transitions to an offline state. According to one embodiment, a small balloon note may appear in the lower right hand corner of the screen of the user's laptop computer 20 to notify her of the change of the network state. When the user arrives in her meeting, the user may plug in her wireless network card to obtain connectivity with the building's internal local wireless network system 130, such as the 802.11 networks, described above. Once the user inserts the wireless network card, the electronic mail application detects the network card and determines that it may reach the desired remote server 49 via the local wireless network 130. According to embodiments of the present invention, the electronic mail application (hereafter Client Application) automatically transitions to the local area wireless network 130. The client side application may display a second small balloon in the lower right hand corner of the user's computer screen indicating that the client side application has switched to a new network connection. Importantly, the user is not required to see the notification, nor react to the notification, and the user is able to continue working with the client side application in her meeting without having to restart the client side application.

After the user completes her meeting, if she realizes that she has another meeting or engagement away from her corporate environment 120, the user may decide to take a bus, or drive to a meeting at a remote location away from her building 120. As the user leaves the building 120 and out of range of the local area wireless network 130, the client side application detects the loss of the local area wireless network and once again transitions to an offline state. While in transit, the user decides to one again connect to the corporate local area network. Accordingly, the user inserts a wide area wireless network communications card or modem if required, such as a GPRS modem, into her computer 20. The client side application is notified that it has now moved outside the corporate firewall and it automatically switches from the local area wireless network to the wide area wireless network for communications connectivity. Once again, the user is not required to restart the client side application because transition between the online and offline and between various connectivity sources is accomplished automatically for the user.

If the user returns from her remote location back to her corporate environment 120, the client side application may detect the presence of the local area wireless network 130 and once again transition from the wide area wireless network to the local area wireless network. If the user returns to her office and re-docks her computer 20 to the wired network connection 125, the client side application detects the return to the wired network and automatically transitions back to the higher speed and more reliable wired network. The foregoing example is for purposes of illustration only and is not to be considered as limiting of the claimed invention, but is provided for purposes of example only.

Figure 2:
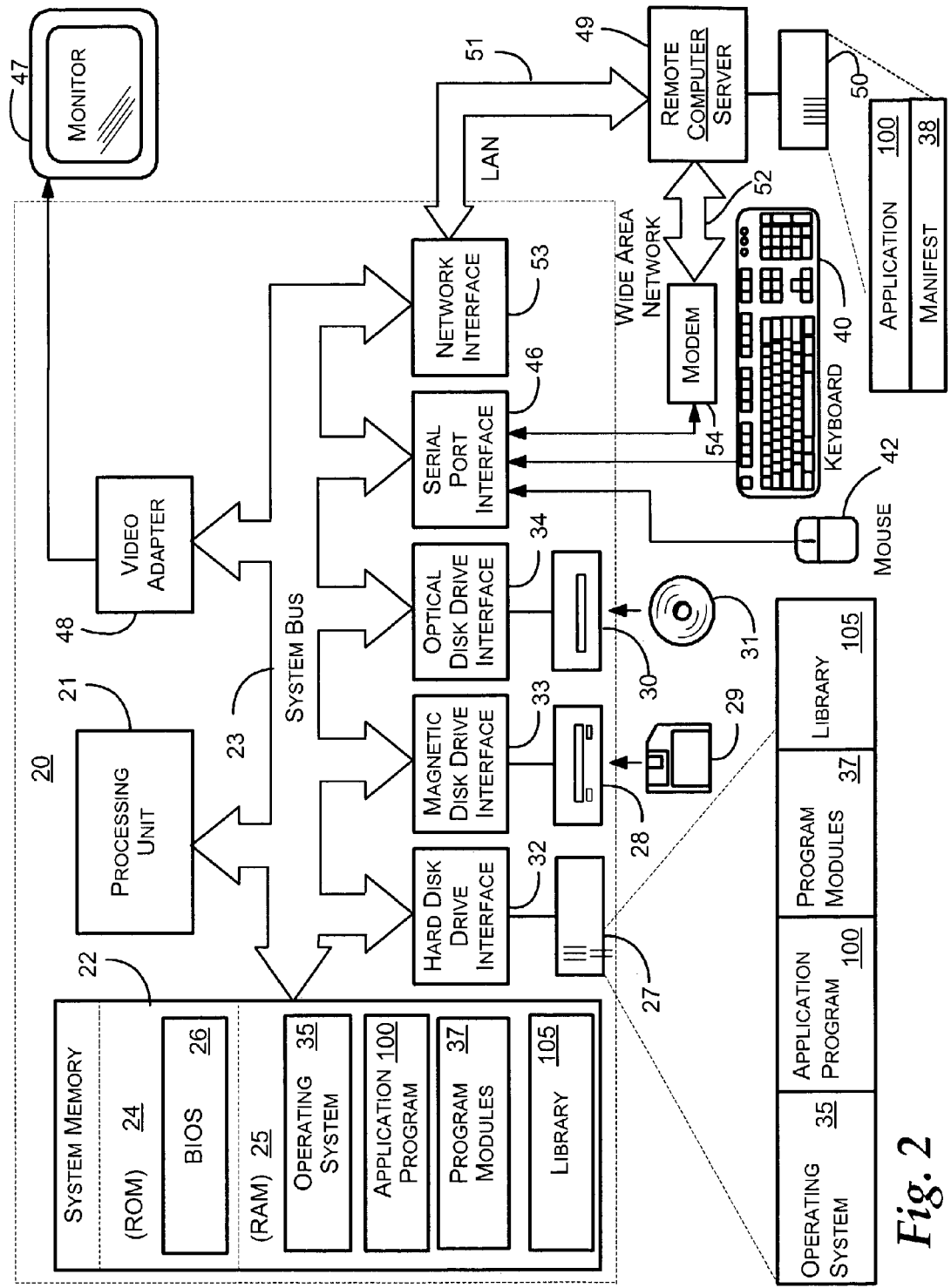
FIG. 2 is a block diagram showing the architecture of a personal computer that provides an illustrative operating environment for embodiments of the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100 such as an e-mail application 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3:
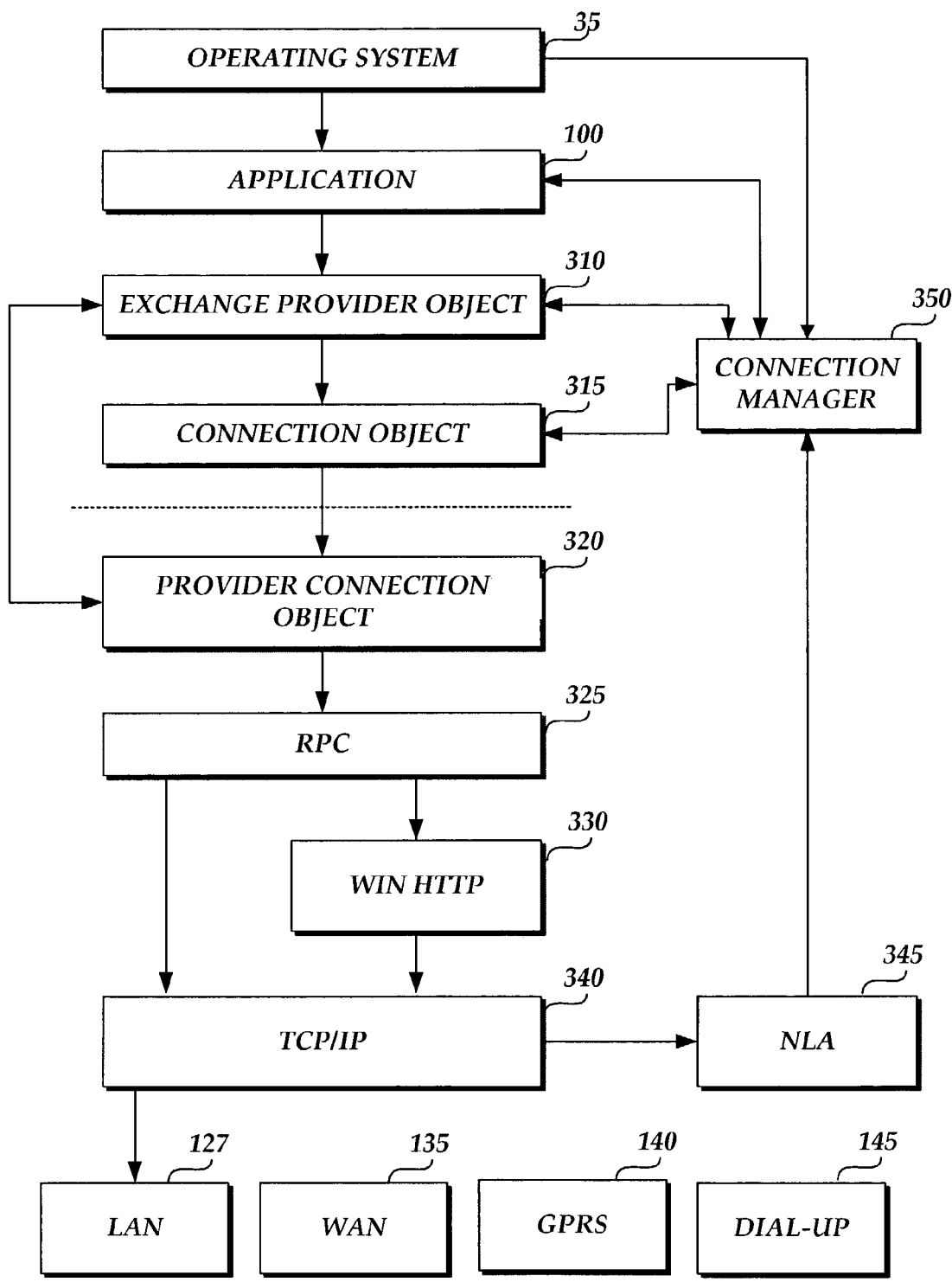
FIG. 3 is a block diagram illustrating interaction between a host application, a connection manager, and connectivity objects for monitoring and acting on connectivity source changes according to embodiments of the present invention.

FIG. 3 is a block diagram illustrating interaction between a host application 100, a connection manager, and connectivity objects for monitoring and acting on connectivity source changes according to embodiments of the present invention. According to embodiments of the present invention, the client electronic mail application 100, such as Outlook® manufactured by Microsoft Corporation of Redmond, Wash., monitors the availability, speed and band with of available connectivity sources to allow the application to reach a remote server such as a remote electronic mail server. A suitable remote Electronic Mail Server is Exchange® manufactured by Microsoft Corporation of Redmond, Wash. Referring to FIG. 3, a connection manager module 350 monitors the status of a plurality of connectivity sources by receiving notification from a set of network location awareness (NLA) application programming interfaces (API), and the connection module 350 reports the status of available connectivity sources to an operating system 35 of the user's computer. Accordingly, when network connectivity sources change. The application 100 through the connection manager module 350 may attempt to switch to a different connectivity source or switch from an online to an offline state automatically without need for user input.

The NLA API's 345, illustrated in FIG. 3 are a set of API's responsible for monitoring the status of a plurality of network connectivity sources. For example, if NLA API's detect a TCP/IP address change or loss of signaling during an online communication between the application 100 and a remote server application, an indication is presented that the connectivity source has been lost to the remote server or that the remote server has been lost due to a hardware, software or other problem that has rendered the server out of service. The NLA API's also monitor physical changes associated with the user's computer that indicate a change in connectivity status. For example, if a cable or other line connecting the computer to a wired connection port is plugged or unplugged, the NLA API's 345 may monitor the line or cable connection adapters of the user's computer 20 to determine that a change has occurred. Moreover, signaling through such lines or the lack thereof may also be monitored by the NLA API's 345 to detect the presence of a connectivity source and to detect the speed and bandwidth associated with the source. Other physical changes including the plugging or unplugging of a wireless network adapter card and the receipt or loss of receipt of a wireless signal. As should be appreciated, the NLA API's 345 may also detect the presence of multiple available network connectivity sources at any given time such that one source may be selected over others as desired.

As the NLA API's 345 detect changes in network connectivity status including speed and bandwidth of individual connectivity sources, connectivity status information is reported to the connection manager module 350. The connection manager module 350 in turn reports the network connectivity status information to the operating system of the user's computer 20. According to an embodiment of the present invention, the operating system determines which network connectivity source is preferred over other available sources. For example, if the operating system may choose between two network connectivitys sources, the source with the highest bandwidth capability is selected. If one network connectivity source is in use and a higher bandwidth source becomes available, the operating system will instruct the connection manager 350 to switch to the high bandwidth network connectivity source. When there is a need to switch the application 100 to an offline state where no network connectivity source is available, or where there is a need to switch the application 100 to a low bandwidth mode, the connection manager module 350 notifies the application 100.

The connection manager module 350 includes and controls three components including the exchange provider object 310, the connection object 315 and the provider object 320. As should be appreciated are those skilled in the art, the connection manager module including the exchange provider object, the connection object and the provider connection object are all software application modules containing sufficient computer executable instructions for performing the functionality described herein. The connection manager module and associated objects 310, 315, 320 may be integrated with the application 100 or may be called by the application 100 when needed.

In addition to generally controlling connection via a plurality of connectivity sources, the connection manager module 350 provides coordination between connectivity sources for the purposes of reducing network bandwidth and server load when reconnecting to servers 49 after a connectivity loss. Connections are normally permitted to connect in parallel, but if the connection manager module 350 detects connectivity failures, then it may force connections from different connectivity sources to take turns such that only one connection attempt is allowed in a given time period. After a given time period of not being able to connect using a given connectivity source, the connection manager module 350 may reduce the interval at which reconnection to the server 49 is allowed. The time period is reset and the connection manager module switches back to the shorter time interval when it detects a significant network change such as a network adapter card (hardware change at the user's computer 20) being added, or if the connection manager module detects that connection was successful via one of a plurality of connectivity sources, or if the user indicates the reconnection attempt time interval should be reset via a user action. Also, the connection manager module may mark one or more connectivity sources as inoperable while shutting down. This prevents the application 100 from attempting online communications, such as remote procedure calls (RPC) during shut down which may add to shutdown delays.

The connection manager module 350 provides a notification mechanism that provides the application 100 with a better understanding of connectivity conditions at a distributed computing network level. This notification allows the application 100 to make better choices about whether a given operation should or should not be allowed. For example, if a connectivity loss has occurred, and a particular operation has been selected, such as transmit electronic mail, notification of connectivity status to the application 100 allows the application to either attempt the operation or not attempt the operation depending on the present connectivity status. Notification of the current connectivity status by the connection manager module 350 also provides for notification to the user of the application 100 of the general state of connectivity via one or more notification balloons displayed on the user's computer display screen as discussed further with reference to FIGS. 4-6.

The connection object 315 understands network state information provided by the connection manager module 350 and controls whether the exchange provider object passes data calls to the remote server 49. The provider connection object 320 is responsible for connection and disconnection of the application 100 via the selected or preferred connectivity source through to the remote server 49. That is, the provider connection object 320 assists the connection manager module 350 to manage the connection and disconnection via available connectivity sources. When a connection is made, then the exchange provider object 310 commences data calls to the remote server 49 through the provider connection object 320. A generic interface is exposed by the provider connection object 320 that allows the connection manager module 350 to connect or disconnect in reaction to varying network connectivity source availability. A callback mechanism is provided for allowing the provider connection object 320 to notify the connection manager module 350 that a connection has been lost in a case where the connection loss is discovered by the connectivity source provider before the connection loss is discovered by the connection manager module 350.

When the connection manager module 350 is notified that a connectivity source that is in use is no longer available, the connection manager module 350 notifies the connection object 315, which in turn cancels all data calls between the exchange provider object 310 and the remote server 49. The connection object also resends the connectivity source that it is no longer available as the source in use.

As described above, with reference to FIG. 1, when a particular network connectivity source is available, or is selected from a plurality of network connectivity sources, the connection manager 350 instructs the connection object 315 to connect the application 100 to the remote server 49 via the selected or available connectivity source. In the first instance, contact is attempted through remote procedure calls (RPC) from the application 100 via a transmission control protocol/internet protocol (TCP/IP) over the selected available network connectivity source, such as the local area network (LAN) 127, the wide area network (WAN) 135, the GPRS network 140, or via a dial-up network 145. As should be appreciated by those skilled in the art, this list of potential network connectivity sources is by way of example and is not limiting of a variety of other connectivity sources through which the application 100 may communicate to a remote server via a TCP/IP connection.

According to an embodiment of the present invention, when the user's computer 20 is connected through a corporate LAN 127 or WAN 135 via a wired connection 125 or via a wireless connection 130, as illustrated in FIG. 1 RPC communication over the TCP/IP connection 340 may be a preferred connectivity source particularly when the users computer is operating within the secure firewall protections of the corporate environment 120. However, if the user removes the computer 20 from the corporate environment outside the corporate environment's firewall and attempts connection with the remote server through the corporate firewall structure, the connection attempt may fail. That is, if the user's computer 20 is moved outside the corporate environment 120 and outside the firewall system, the NLA API's 345 may detect the availability of a wireless network 140 or a dial-up connection 145 and notify the connection manager 350 of the availability of these networks. However, when the application 100 attempts contact with the server 49 via the TCP/IP connection, the connection attempt may fail, due to security systems in place at the corporate environment firewall to prevent such communication through to the server 49.

If the attempted connection between the application 100 with the remote server 49 via a TCP/IP connection over a network connectivity source outside the corporate firewall fails, a determination is made as to whether user's computer is configured for communication via an RPC communication over a hypertext transfer protocol connection. If the user's computer is so configured, the application 100 via the connection manager 350 attempts contact with the remote server by remote procedure call (RPC) communication through the remote server via an HTTP communication. As should be appreciate by those skilled in the art, many corporate environments include secure HTTP communication ports through the corporate firewalls so that the remote procedure calls from the application 100 via an HTTP communication may "tunnel" through the corporate firewall to the desired remote server 49.

In addition to monitoring availability of and controlling use of available connectivity sources, the connection manager module 350 also may detect dropped connections to a server 49. According to embodiments of the invention, before a connection is made to a server, the Internet Protocol (IP) address of the server 49 is determined followed by connection to the server. After connection, the connection manager module 350 determines whether any of the TCP connections on the user's computer 20 match the IP address of the server 49. If so, then the connection manager module periodically (for example, every 15 seconds) determines whether there are still any connections to that IP address. If no connections are made to that IP address, the connection manager module determines that the connection has failed or dropped.

Alternatively, the connection manager module 350 and the provider connection object may be provided a notification method for monitoring whether connection to a server 49 has failed. That is a software mechanism may be provided as part of the connection manager module and as part of the provider connection object for notification of the connection manager module 350 when a connection with a server 49 has failed. If a failed connection is detected, then the connection manager module and the provider connection object schedule a poll (for example, an RPC) on a background software thread. If the connection fails, then the poll fails. If the poll fails, then the provider connection object notifies the connection object 315 of the disconnection. The connection manager module 350 is in turn notified that the connection is disconnected, and the connection manager module may then attempt reconnection between the application 100 and the server 49.

Figure 4:
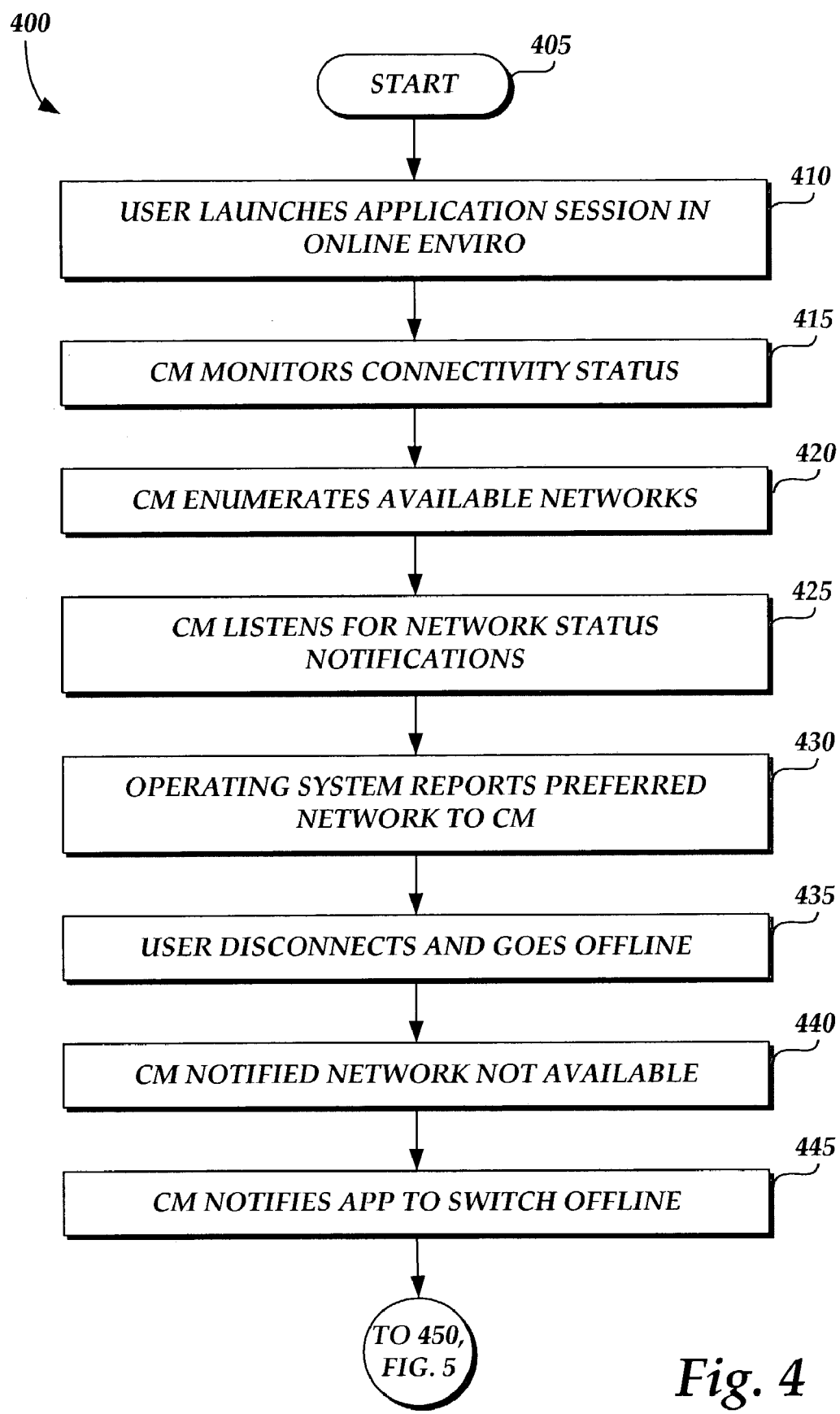
FIGS. 4, 5, 6 are flow diagrams illustrating the steps performed by a method and system of the present invention for monitoring and controlling communication connectivity across a range of connectivity sources and between online and offline communications sessions according to embodiments of the present invention.
Figure 5:
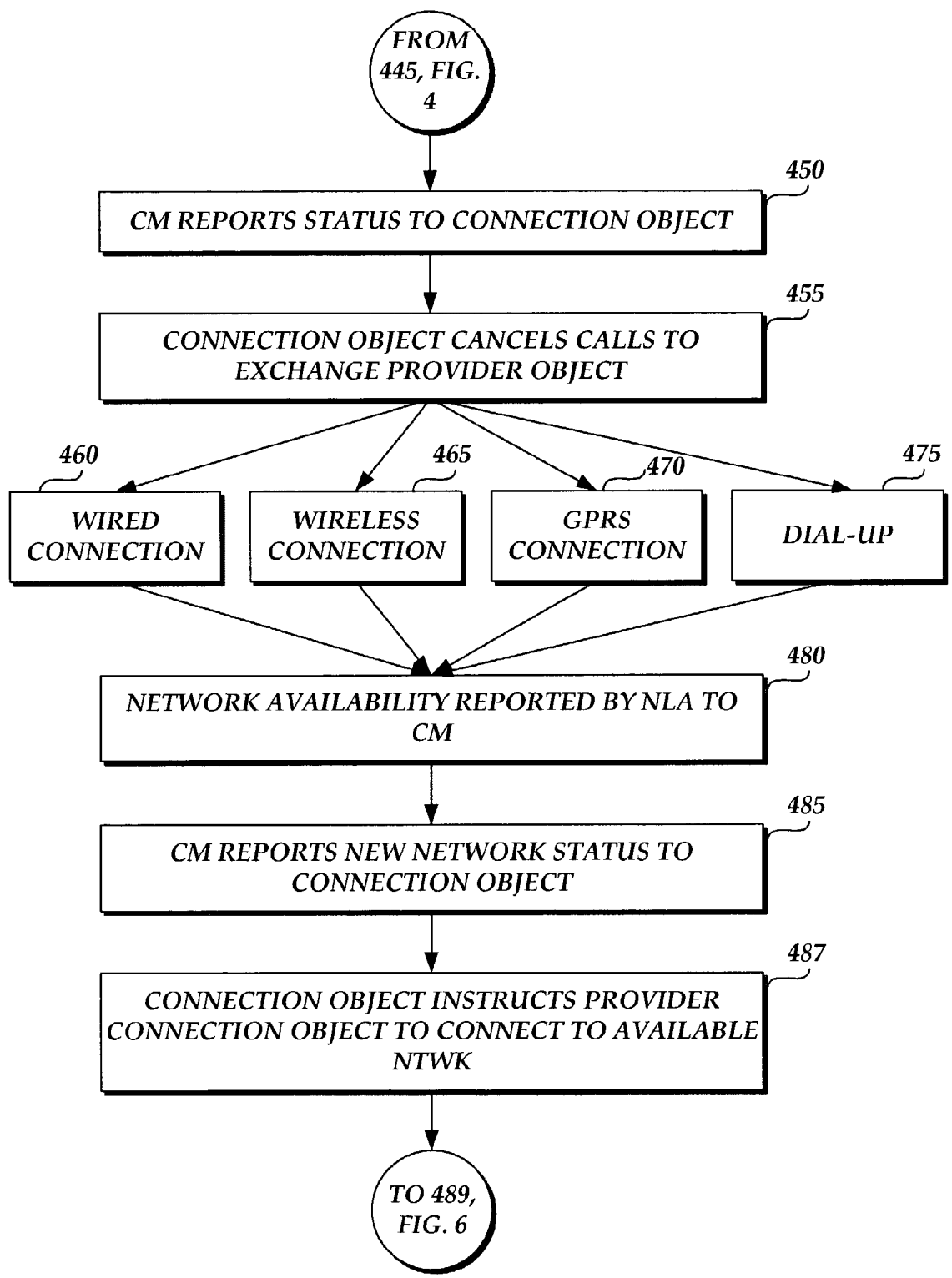
Figure 6:
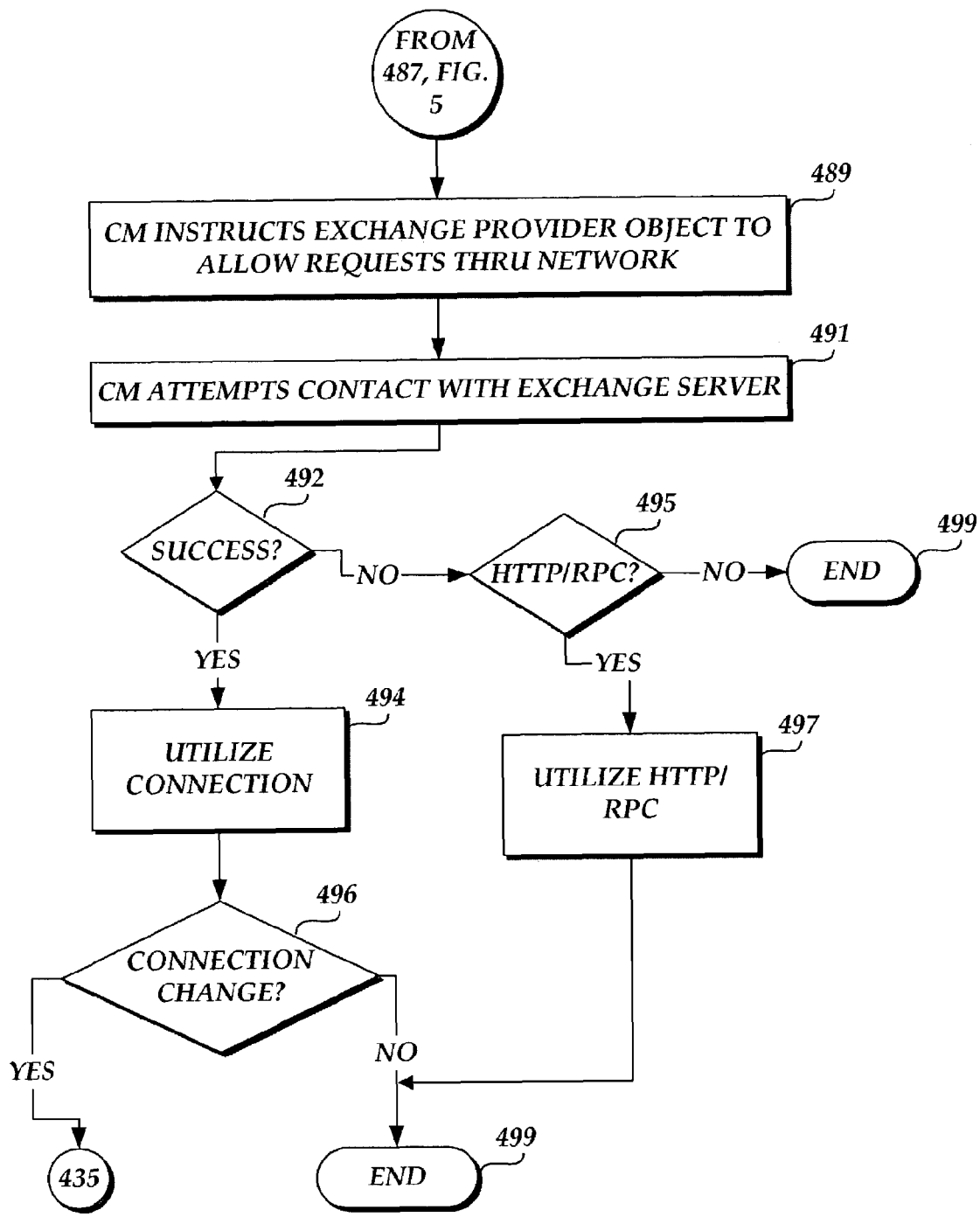

FIGS. 4, 5, 6 are flow diagrams illustrating the steps performed by a method and system of the present invention for monitoring and controlling communication connectivity across a range of connectivity sources and between online and offline communications sessions according to embodiments of the present invention. The flow diagram illustrated in FIGS. 4, 5, and 6 is described below with reference to an example operation of the functionality of the present invention. Examples provided for discussion of FIGS. 4, 5, and 6 are for purposes of illustration only and are not limiting of the scope of the claimed invention. The method 400 begins at start block 405 and proceeds to block 410 where a user launches an electronic mail application 100 in an online session. At block 415, the connection manager module 350 monitors the connectivity status of the network connection in use by the application 100 by receiving notifications from the NLA API's 345. At block 420, the connection manager module 350 enumerates available network connectivity sources from the enumerations of sources received from the NLA API's 345. At block 425, the connection manager module continues to listen for network status notifications from the NLA API's 345.

At block 430, the operating system 300 of the users computer 20 reports preferred network connectivity sources to the connection manager 350. As described above with reference to FIG. 3, if the preferred network connectivity source is available for use by the application 100, but a different connectivity source is presently in use, the connection manager module 350 causes the connection object 315 to change the connection from the source presently in use to the preferred source, as described above with reference to FIG. 3. If the connectivity source is automatically changed, as described, a balloon notification may be provided to the user on the screen of the user's computer 20 notifying the user that the network connectivity source is switching to the new network source without the need for user action.

At block 435, by way of example, the user disconnects her computer 20 from a wired connection 125 and goes offline. Block 435 is illustrative of any action on the part of the user to disconnect or otherwise change the connectivity between her computer 20 and a network connectivity source. As a result of the user's action, the NLA API's 345 detect that the user has disconnected her computer from the wired connection 125 and notifies the connection manager module 350 of the change in status. At block 450, the connection manager module 350 instructs the connection object 315 to cause the exchange provider object 310 to cease data calls to the server 49. At block 445, the connection manager module 350 notifies the application 100 to switch to an offline state. As a result, according to an embodiment of the present invention, a notification balloon may be presented to the user on the screen of the user's computer 20 to notify the user that no network connectivity is available and that the application 100 is now in an offline mode.

As should be appreciated, the user's computer 20 is now operating in an offline environment. As described above with reference to FIGS. 1 and 3, under a number of conditions, a network connectivity source may be reestablished and made available to the application 100 to reconnect the user, if desired. For example, at block 460, the user may reconnect her computer to a wired connection 125, as described above with reference to FIG. 1. At block 465, the user may insert a wireless connection PCMCIA card, for example, for connection via an 802.11 wireless network. At block 470, the user may move outside her corporate type environment and obtain connectivity through an external wireless network such as a GPRS network 140. Alternatively, the user may obtain connectivity through some other source such as a dial-up connection 145 or other connectivity sources.

At block 480, the NLA API's 345 monitor the connectivity status of the user's computer 20. If the user obtains a connectivity status through aforementioned connectivity connections, the network availability is reported by the NLA API's to the connection manager module 350 at block 480. The connection manager module 350 reports the connectivity status to the operating system 300, as described above, and if more than one connectivity source is available, the operating system 300 will report its preferred connectivity source to the connection manager module. At block 485, the connection manager module reports the new connectivity status to the connection object 315. At block 487, the connection object instructs the provider connection object to connect to the available network connectivity source.

It will be appreciated that various connectivity sources provide varying data transmission speeds and bandwidths. If the only available connectivity source has low bandwidth, the application 100 may be connected to the desired server via the low bandwidth connectivity source, and a notification may be provided to the user that the user is operating in a low bandwidth mode. Once the application is connected to the desired server via a low bandwidth connectivity source, the application 100 may be configured to operate according to an alternative bandwidth profile whereby the behavior of the application in terms of the quantity and speed of data transmission may be altered to reflect the reduced bandwidth availability of the low bandwidth connectivity source. For additional description of utilization of varying bandwidth profiles, see United States patent application entitled "Methods for Tailoring a Bandwidth Profile for an Operating Environment", Ser. No. 10/462,188, Filed: Jun. 16, 2003, Assigned to the same Assignee as the present invention, and which is incorporated herein my reference as if fully set out herein.

At block 489, FIG. 6, the exchange provider object is allowed to pass data requests though the provider connection object to the desired remote server. At block 491, the connection manager module attempts contact with the exchange server via RPC communication via TCP/IP protocol through the selected connectivity source. At block 492, a determination is made as to whether the connection is successful. If the connection is successful, at block 494, the connectivity source is utilized. At block 496 a determination is made as to whether another connection change is received, and if so, the method proceeds back to blocks 460, 465, 470, and 475 in the case of a new connectivity source connection, or back to block 435 in the case of a disconnection or loss of connectivity source.

Referring back to block 492, if the provider connection object attempts contact with the selected connectivity source but contact fails, the method proceeds to block 495. As described above with reference to FIG. 3, if the user has moved her computer outside a corporate environment and thus outside a corporate firewall and is attempting to communicate with a remote server inside the corporate firewall, the attempted connection via the TCP/IP protocol may fail due to security restraints at the firewall. Accordingly, at block 495 a determination is made as to whether user's computer configured for RPC communication over an HTTP protocol connection whereby remote procedure calls from the application 100 are passed to the desired server via an HTTP protocol connection through the corporate firewall through communication ports established in the corporate environment 120 to accept HTTP protocol communication. If the users computer 20 is configured for RPC over HTTP communication, the method proceeds to block 497 and the HTTP protocol connection is utilized by the application 100.

As described herein with reference to FIGS. 4, 5, and 6, upon each change in connectivity status, a notification balloon, dialog or other alert may be provided to the user on the users screen to alert the user of the change in status. Other notifications not specifically described above include notifications that the desired server is offline and notifications that a particular server connection has been restored.

Advantageously, in accordance with the embodiments of the present invention, a user may conduct a session on an application capable of online communication, such as an electronic mail application whereby the session may switch from an online state to an offline state and whereby the source of connection from the application and a remote server may change without loss of use of the application during transition between states. Accordingly, methods and systems for monitoring the availability of connectivity sources and for providing connectivity across a range of electronic communications systems and for providing predictable application performance across online and offline sessions and across varying connectivity speeds and reliability are provided.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of monitoring and providing online connectivity sources, comprising;
 monitoring a connectivity status of one or more connectivity sources, the one or more connectivity sources comprising at least a first connectivity source and a second connectivity source;
 selecting one of one or more available connectivity sources for use for online communications;
 connecting a user's computer to a remote computing system via the selected available connectivity source;
 monitoring whether the connection to the remote computing system via the selected connectivity source has failed;
 if the connection is detected as failed, then scheduling a poll on a background software thread;
 if the poll fails, then generating a notification that the connection to the remote computing system via the selected connectivity source is disconnected, wherein the selected connectivity source comprises the first connectivity source;
 attempting reconnection to the remote computing system;
 if the selected connectivity source is lost, determining whether the second connectivity source is available;

if the second connectivity source is available, automatically connecting the user's computer to the remote computing system via the second connectivity source without user action;

reducing an interval at which reconnection to the remote computing system is allowed from a first interval to a second interval after not being able to connect to the remote computing system using the first connectivity source for a given time period so that a connection attempt may be made to the remote computing system via the second connectivity source after the reduced interval;

resetting the time period upon detecting a network change, the network change comprising a hardware change at the user's computer;

switching back to the first interval upon detecting the network change; and marking the one or more connectivity sources as inoperable while the user's computer is shutting down to prevent subsequent online communication events from adding to shutdown delays.

2. The method of claim 1, whereby monitoring the connectivity status of one or more connectivity sources includes monitoring network connectivity hardware at the user's computer.

3. The method of claim 2, further comprising monitoring whether the user's computer is wired to the connectivity source.

4. The method of claim 3, further comprising monitoring whether signaling is received from a connectivity source via a wired connection.

5. The method of claim 2, further comprising monitoring whether the user's computer includes a wireless access card or antenna.

6. The method of claim 5, further comprising monitoring whether signaling is received via the wireless access card or antenna from a connectivity source.

7. The method of claim 1, whereby monitoring the connectivity status of a plurality of one or more connectivity sources includes determining a data transfer speed and bandwidth capacity associated with a given connectivity source.

8. The method of claim 1, whereby monitoring the connectivity status of a plurality of the one or more connectivity sources includes monitoring the connectivity status by a network location awareness (NLA) application programming interface (API).

9. The method of claim 1, after monitoring the connectivity status of a plurality of the one or more connectivity sources, reporting the connectivity status to a network connection manager module.

10. The method of claim 9, further comprising reporting the connectivity status to a user's computer operating system.

11. The method of claim 9, whereby connecting the user's computer to the remote computing system via the selected available connectivity source includes directing a connection software module to provide a provider connection software module with the selected available connectivity source;

causing the provider connection software module to connect the user's computer to the remote computing system via the selected connectivity source; and directing an exchange provider software module to begin passing data calls from the user's computer to the remote computing system via the selected connectivity source.

12. The method of claim 1, prior to connecting the user's computer to the remote computing system via the selected available connectivity source, determining which of one or more available connectivity sources is a preferred connectivity source.

13. The method of claim 12, whereby determining which of the one or more connectivity sources is a preferred connectivity source includes determining which of the one or more available connectivity sources has a highest bandwidth capacity.

14. The method of claim 1, whereby selecting one or more available connectivity sources includes selecting one of the one or more available connectivity sources for connecting a software application in use on the user's computer to a remote server for online communication services.

15. The method claim 14, further comprising connecting the software application to a remote software application at the remote server for online communication services.

16. The method of claim 1, further comprising communicating between the user's computer and the remote computing system via the selected connectivity source.

17. The method of claim 16, further comprising communicating via the selected connectivity source using a transmission control protocol/Internet protocol (TCP/IP) communication.

18. The method of claim 17, further comprising communicating by remote procedure calls (RPC) between the user's computer and the remote computing system over the TCP/IP communication connection.

19. The method of claim 17, whereby if communication using the TCP/IP communication connection fails, determining whether the user's computer is configured to communicate over the selected connectivity source using remote procedure calls (RPC) over a hypertext transfer protocol (HTTP) communication connection; and if the user's computer is configured to communicate over the selected connectivity sources using the RPC over the HTTP communication connection, connecting the user's computer to the remote computing system by the RPC over the HTTP communication connection via the selected connectivity source.

20. The method of claim 1, whereby monitoring the connectivity status of one or more connectivity sources includes determining whether a presently in use connectivity source is disabled.

21. The method of claim 20, further comprising determining whether the remote computing system with which the user's computer is communicating becomes disabled from communication with the user's computer.

22. The method of claim 1, whereby monitoring the connectivity status of one or more connectivity sources includes determining whether the available alternate connectivity source from the connectivity source presently in use is a preferred connectivity source.

23. The method of claim 22, further comprising determining whether an alternate connectivity source provides a higher bandwidth capacity from the connectivity source presently in use.

24. The method of claim 22, whereby if the available alternate connectivity source is the preferred connectivity source, automatically connecting the user's computer to the remote computing system via the alternate connectivity source.

25. The method of claim 1, whereby if the second connectivity source is not available, automatically switching the user's computer from an online to an offline state.

26. The method of claim 25, further comprising causing a connection software module to instruct an exchange provider software module to suspend data calls to the remote computing system via the presently in use connectivity source.

27. The method claim 1, further comprising notifying a user of the user's computer of any changes in connectivity status.

28. A system for monitoring and providing online connectivity sources, comprising;
a connection manager module operative
   to monitor a connectivity status of one or more connectivity sources, the one or more connectivity sources comprising at least a first connectivity source and a second connectivity source;
   to select an available one of the one or more connectivity sources for use for online communications;
   to connect a client application to a remote application via the selected available connectivity source;
   to monitor whether the connection to the remote computing system via the selected connectivity source has failed;
   if the connection is detected as failed, then to schedule a poll on a background software thread;
   if the poll fails, then to generate a notification that the connection to the remote computing system via the selected connectivity source is disconnected, wherein the selected connectivity source comprises the first connectivity source;
   to attempt reconnection to the remote computing system;
   to determine whether the second connectivity source is available if the selected connectivity source is lost;
   to automatically connect the client application to the remote application via the second connectivity source without user action if the second connectivity source is available;
   to reduce an interval at which reconnection to the remote computing system is allowed from a first interval to a second interval after not being able to connect to the remote computing system using the first connectivity source for a given time period so that a connection attempt may be made to the remote computing system via the second connectivity source after the reduce interval;
   to reset the time period upon detecting a network change, the network change comprising a hardware change at a user's computer for connecting to the remote computing system using the one or more connectivity sources;
   to switch back to the first interval upon detecting the network change; connectivity sources; and
   to mark the one or more connectivity sources as inoperable while shutting down to prevent subsequent online communication events from adding to shutdown delays.

29. The system of claim 28, whereby the connection manager module is further operative to communicate with a network location awareness (NLA) application programming interface (API);
the NLA API being operative
   to monitor network connectivity hardware at the user's computer;
   to monitor whether the user's computer is wired to a connectivity source;
   to monitor whether signaling is received from the connectivity source via a wired connection;
   to monitor whether the user's computer includes a wireless access card or antenna;
   to monitor whether signaling is received via the wireless access card or antenna from the connectivity source;
   to determine a data transfer speed and bandwidth capacity associated with the connectivity source; and
   to report the connectivity status to the connection manager module.

30. The system of claim 28, whereby the connection manager module is further operative to receive a preferred connectivity source for a computer operating system through which the client application is operating and to automatically connect the client application to the remote application via the preferred connectivity source if the preferred connectivity source is available.

31. The system of claim 28, whereby the connection manager module is further operative
   to direct a connection module to provide a provider connection software module with the selected connectivity source;
   to direct the provider connection software module to connect the user's computer to the remote computing system via the selected connectivity source; and
   to direct an exchange provider software module to begin passing data calls from the user's computer to the remote computing system via the selected connectivity source.

32. The system of claim 31, whereby the connection manager is further operative
   to determine whether the client application is configured to communicate over the selected connectivity source using remote procedure (RPC) calls over a hypertext transfer protocol (HTTP) communication connection, if communication using a TCP/IP communication connection fails; and
   to connect the client application to the remote application by the RPC over the HTTP communication connection via the selected connectivity source, if the user's computer is configured to communicate over the selected connectivity sources using the RPC over the HTTP communication connection.

33. A computer readable medium containing instructions which when executed by a computer, perform a method of monitoring and providing online connectivity sources, comprising;
   monitoring a connectivity status of a plurality of connectivity sources, the plurality of connectivity sources comprising at least a first connectivity source and a second connectivity source;
   if more than one of the plurality of connectivity sources is available, then determining which of the plurality of available connectivity sources is a preferred connectivity source;
   selecting the preferred connectivity source for use for online communications;
   connecting a client application to a remote application via the selected connectivity source, wherein if the selected connectivity source has a low bandwidth, then providing a notification that the client application is operating in a low bandwidth mode and altering a quantity and speed of data transmission of the client application according to an alternative bandwidth profile to reflect a reduced bandwidth availability of the low bandwidth connectivity source;
   monitoring whether the connection to the remote computing system via the selected connectivity source has failed;
   if the connection is detected as failed, then scheduling a poll on a background software thread;
   if the poll fails, then generating a notification that the connection to the remote computing system via the selected connectivity source is disconnected, wherein the selected connectivity source comprises the first connectivity source;

attempting reconnection to the remote computing system;

if the selected connectivity source is lost, determining whether the second connectivity source is available;

if the second connectivity source is available, automatically connecting the client application to the remote application via the second connectivity source without user action;

communicating via the selected or the second connectivity source using a transmission control protocol/Internet protocol (TCP/IP) communication;

if communication using the TCP/IP communication connection fails, determining whether the client application is configured to communicate over the selected or second connectivity source using remote procedure calls (RPC) over a hypertext transfer protocol (HTTP) communication connection;

if the client application is configured to communicate over the selected or second connectivity sources using the RPC over the HTTP communication connection, connecting the client application to the remote application via the RPC over the HTTP communication connection via the selected or second connectivity source;

reducing an interval at which reconnection to the remote computing system is allowed from a first interval to a second interval after not being able to connect to the remote computing system using the first connectivity source for a given time period so that a connection attempt may be made to the remote computing system via the second connectivity source after the reduced interval;

resetting the time period upon detecting a network change, the network change comprising a hardware change at a client computer for executing the client application;

switching back to the first interval upon detecting the hardware change at the client computer; and marking at least one of the plurality of connectivity sources as inoperable while shutting down to prevent RPC during shutdown from adding to shutdown delays.

34. The computer readable medium of claim 33, whereby monitoring the connectivity status of the plurality of connectivity sources includes monitoring network connectivity hardware at a user's computer on which the client application is running.

35. The computer readable medium of claim 34, further comprising monitoring whether the user's computer is wired to a connectivity source.

36. The computer readable medium of claim 35, further comprising monitoring whether signaling is received from the connectivity source via a wired connection.

37. The computer readable medium of claim 34, further comprising monitoring whether the user's computer includes a wireless access card or antenna.

38. The computer readable medium of claim 37, further comprising monitoring whether signaling is received via the wireless access card or antenna from a connectivity source.

39. The computer readable medium of claim 34, whereby monitoring the connectivity status of the plurality of connectivity sources includes determining a data transfer speed and bandwidth capacity associated with the plurality of connectivity source.

40. The computer readable medium of claim 33, whereby monitoring the connectivity status of one or more connectivity sources includes monitoring the connectivity status by a network location awareness (NLA) application programming interface (API).

41. The computer readable medium of claim 33, whereby connecting the client application to the remote application via the selected connectivity source includes directing a connection software module to provide a provider connection software module with the selected available connectivity source;

causing the provider connection software module to connect the client computer to the remote computing system via the selected connectivity source; and directing an exchange provider software module to begin passing data calls from the client computer to the remote computing system via the selected connectivity source.

42. The computer readable medium of claim 33, whereby monitoring the connectivity status of the plurality of connectivity sources includes determining whether a presently in use connectivity source is disabled.

43. The computer readable medium of claim 33, further comprising determining whether the remote application with which the client application is communicating becomes disabled from communication with the client computer.

44. The computer readable medium of claim 33, whereby monitoring the connectivity status of the plurality of connectivity sources includes determining whether an available alternate connectivity source from the plurality of connectivity source presently in use is a preferred connectivity source.

45. The computer readable medium of claim 44, further comprising determining whether the alternate connectivity source provides a higher bandwidth capacity from the plurality of connectivity sources presently in use.

46. The computer readable medium of claim 45, whereby if the available alternate connectivity source is the preferred connectivity source, automatically connecting the client application to the remote application via the alternate connectivity source.

47. The computer readable medium of claim 33, whereby if the second connectivity source is not available, automatically switching the client application from an online to an offline state.

* * * * *